US012623334B2

(12) United States Patent
Carl

(10) Patent No.: US 12,623,334 B2
(45) Date of Patent: *May 12, 2026

(54) APPARATUS WITH HAND GRIP AND METHOD FOR MOUNTING HAND GRIP

(71) Applicant: Transform SR Brands LLC, Hoffman Estates, IL (US)

(72) Inventor: Ross Carl, River Forest, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 625 days.

This patent is subject to a terminal disclaimer.

(21) Appl. No.: 18/086,498

(22) Filed: Dec. 21, 2022

(65) Prior Publication Data

US 2023/0131566 A1 Apr. 27, 2023

Related U.S. Application Data

(63) Continuation of application No. 16/822,149, filed on Mar. 18, 2020, now Pat. No. 11,554,477, which is a continuation of application No. 14/980,369, filed on Dec. 28, 2015, now Pat. No. 10,596,694.

(51) Int. Cl.
*B25G 1/10* (2006.01)

(52) U.S. Cl.
CPC .................................... *B25G 1/102* (2013.01)

(58) Field of Classification Search
CPC ............. B25G 1/102; B25G 1/00; B25G 1/10
USPC .................................................... 81/489, 488
See application file for complete search history.

(56) References Cited

U.S. PATENT DOCUMENTS

| | | | | |
|---|---|---|---|---|
| 2,007,476 | A | 7/1935 | Miller | |
| 2,498,107 | A | 2/1950 | Ferguson | |
| 2,749,597 | A | 6/1956 | Fus | |
| 3,393,423 | A | 7/1968 | Adams | |
| 4,048,708 | A | 9/1977 | Briles | |
| 4,364,174 | A * | 12/1982 | De Asis | B26B 1/10 76/104.1 |
| 4,645,235 | A | 2/1987 | Joseph | |
| 4,683,096 | A | 7/1987 | Ferraro | |
| 4,766,642 | A | 8/1988 | Gaffney et al. | |
| 4,794,694 | A | 1/1989 | Daniel et al. | |
| 5,259,274 | A * | 11/1993 | Hreha | B25G 3/34 81/22 |
| 5,671,613 | A | 9/1997 | Hoover et al. | |
| 6,212,979 | B1 * | 4/2001 | Wang | B25B 7/123 30/340 |

(Continued)

FOREIGN PATENT DOCUMENTS

CN 201165022 12/2008

*Primary Examiner* — Hadi Shakeri
(74) *Attorney, Agent, or Firm* — McAndrews, Held & Malloy, Ltd.

(57) ABSTRACT

An apparatus having a handle with a mounted hand grip is described. A first end wall surface of the hand grip is tapered from a base surface to a top surface of the hand grip. A second end wall surface of the hand grip is tapered from the base surface to the top surface of the hand grip. A first end wall of the recess engages the first end wall surface of the hand grip and prevents movement of the first end wall surface away from the base surface of the recess. A second end wall of the recess engages the second end wall surface of the hand grip and prevents movement of the first end wall surface away from the base surface of the recess.

20 Claims, 5 Drawing Sheets

(56) References Cited

U.S. PATENT DOCUMENTS

| | | | | |
|---|---|---|---|---|
| 7,730,743 | B2 | 6/2010 | Hoover et al. | |
| 9,027,445 | B2 * | 5/2015 | Sumg | B25B 13/58<br>81/125 |
| 2012/0192429 | A1 | 8/2012 | Savarese | |
| 2014/0116211 | A1 | 5/2014 | Griffin et al. | |

* cited by examiner

APPARATUS WITH HAND GRIP AND METHOD FOR MOUNTING HAND GRIP

The present application is a continuation of U.S. application Ser. No. 16/822,149, filed Mar. 18, 2020, which is a continuation of U.S. application Ser. No. 14/980,369, filed Dec. 28, 2015, now U.S. Pat. No. 10,596,694. The aforementioned documents are hereby incorporated herein by reference in their entirety.

FIELD OF THE INVENTION

Various embodiments relate to hand grips, tools having hand grips, and mounting hand grips to tools.

BACKGROUND OF THE INVENTION

Many tools such a hand tools, power tools, cutlery, etc., provide handles which a user of the implement may grasp in order to hold and manipulate the tool. Such tools may be formed from metal or other hard materials. Such tools may further include handles, hand grips, or both that are formed from softer materials such as wood, plastic, rubber, etc., which users may find more suitable for grasping and gripping than the hard materials used to form the tool. Since the handles, grips, or both are formed from a different material than the tool, the handles and grips must be joined or otherwise affixed to the tool.

To this end, a tool may include a tang to which a handle or grip is affixed. For example, hand grips may be placed on each face of the tang such that the tang is sandwiched between the hand grips. Rivets, screws, or other fasteners may pass through an outer face of one hand grip, through the tang, and through the outer face of the other hand grip. In this manner, the fasteners affix the hand grips to the tool via its tang.

Limitations and disadvantages of conventional and traditional approaches should become apparent to one of skill in the art, through comparison of such systems with aspects of the embodiments set forth in the remainder of the present application.

BRIEF SUMMARY OF THE INVENTION

Methods of mounting hand grips to a handle and handles with such hand grips are substantially shown in and/or described in connection with at least one of the figures, and are set forth more completely in the claims.

Advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

DETAILED DESCRIPTION OF THE INVENTION

Aspects of the present invention are generally related to hand grips and handles and more specifically to handles with mounted hand grips and methods for mounting hand grips into such handles. The following description focuses upon a manner of mounting hand grips to a handle of a tool such as a knife, hammer, screw driver, etc. However, various aspects of the disclosed measurement devices may be applicable to a wide range of handheld implements such as power tools, gardening tools, cutlery, etc.

Figure 1:
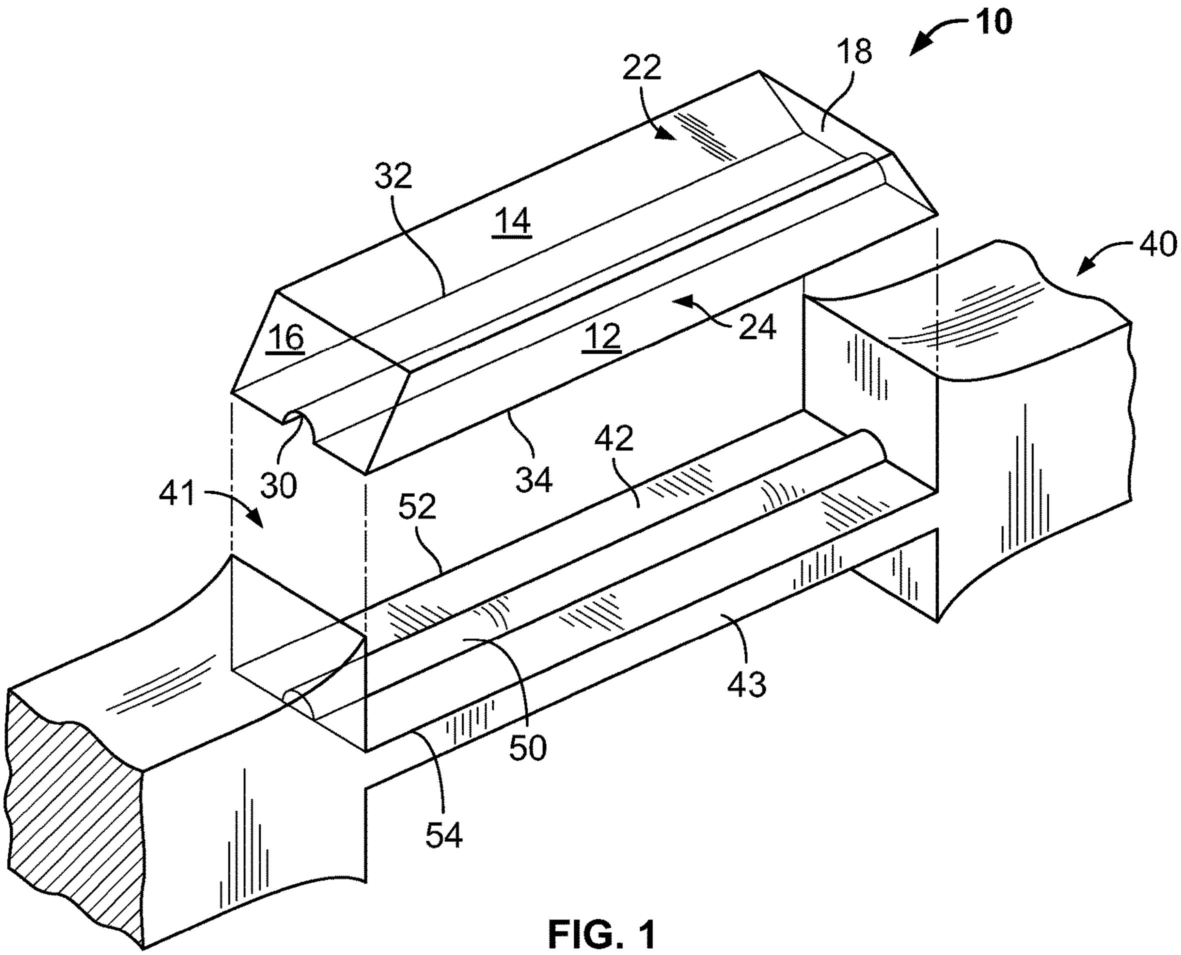
FIG. 1 depicts a hand grip and handle in accordance with one embodiment.

Referring now to FIG. 1, a hand grip 10 and handle 40 are shown prior to mounting the hand grip 10 to the handle 40. The hand grip 10 may be formed from various different materials such as wood, plastic, rubber, etc., which users may find more suitable for grasping and gripping than the hard materials used to form the handle 40. Mounting such a softer hand grip 10 to the hard handle 40 may make using the associated implement (e.g., hand tool) more pleasing to the user.

To this end, the hand grip 10 may comprise a base surface 12, a top surface 14 opposite the base surface, a first end surface 16, a second end surface 18 opposite the first end surface, and a first lateral surface 22, and second lateral surface 24 opposite the first lateral surface 22. The base and top surfaces 12, 14 are generally planar and parallel to each other. Similarly, the first and second lateral surfaces 22, 24 are generally planar and parallel to each other. The first and second end surfaces 16, 18 are likewise generally planar. However, unlike the lateral surfaces 22, 24, the end surfaces 16, 18 are not parallel to each other but are angled inwardly such that the hand grip 10 is tapered from the base surface 12 toward the top surface 14. As such, a length Lb of the base surface 12 between the end wall surfaces 16, 18 is greater than a length Lt of the top surface 14 between the end wall surfaces 16, 18.

While generally planar, the base surface 12 may include a channel 30 that provides a depression into the base surface 12. The channel 30 may be positioned centrally between a first lateral edge 32 and a second lateral edge 34 of the base surface 12. Moreover, the channel 30 may run the length of the base surface 12 from the first end surface 16 to the second end surface 18.

The handle 40 is formed from a malleable material such as forged stainless steel or another metal which is deformable via a compressive stress. The handle 40 may include one or more recesses 41 having a greater length Lr than the hand grip 10 in order to permit the respective recess 41 to receive the hand grip 10. As shown in FIG. 1, the handle may include two recesses 41 opposite each other to permit mounting of hand grips 10 to opposite sides of the handle 40. In such an embodiment, the hand grips 10 may sandwich a tang 43 of the handle 40. However, in other embodiments, the handle 40 may include a recess 41 for receiving a single hand grip 10.

As shown, the recess 41 may include a base surface 42, a first end wall 46, and a second end wall 48. Furthermore, the base surface 42 may include a rib or projection 50. The rib 50 may project from the base surface 42 and be positioned centrally between a first lateral edge 52 and a second lateral edge 54 of the base surface 42. Moreover, the rib 50 may run a length Lr of the base surface 42 from the first end wall 46 to the second end wall 48.

Figure 2:
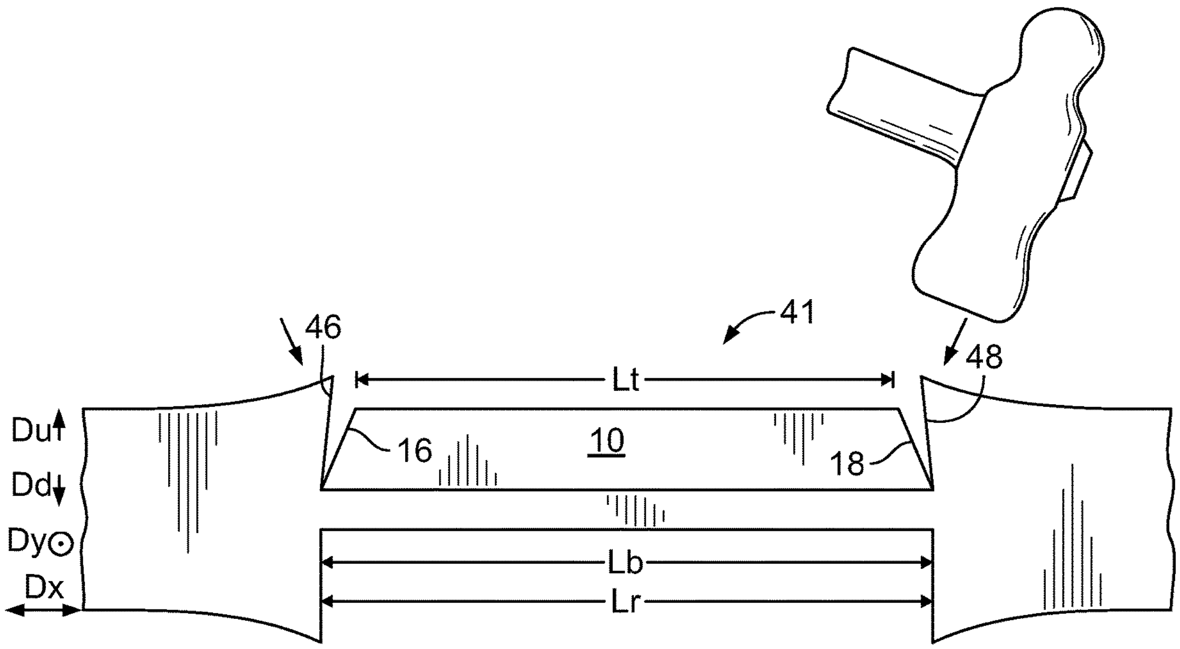
FIGS. 2-4 depict a process of mounting a hand grip to a handle in accordance with one embodiment.

As noted above, the end surfaces 16, 18 of the hand grip 10 are tapered such that the length Lb of the base surface 12 is greater than the length Lt of the top surface 14. In one embodiment, the first and second end walls 46, 48 are not tapered or are tapered to a lesser extent than the end surfaces 16, 18 as shown in FIG. 2. As such, the recess 41 may receive the hand grip 10 as shown in FIG. 2. Moreover, when placed in the recess 41, the base surface 12 of the hand grip 10 engages the base surface of the recess 41 such that the channel 30 of the hand grip 10 receives the rib 50 of the recess 41. Thus, when placed in the recess 41 in the manner shown in FIG. 2, the end walls 46, 48 prevent movement of the hand grip 10 in the longitudinal direction Dx. Moreover, the rib 50 due to its receipt by channel 30 prevents movement of the hand grip 10 in the lateral direction Dy. Furthermore, the base surface 42 prevents movement of the hand grip 10 in the downward direction Dd. However, the recess 41 as shown in FIG. 2 does not prevent movement of the hand grip 10 in the upward direction. As such, the hand grip 10 may be removed from the recess 41 by simply pulling the hand grip 10 from the recess 41.

Figure 3:
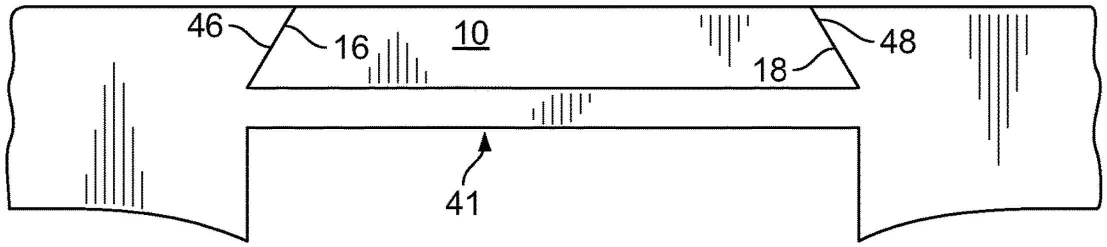

As shown in FIG. 2, the end walls 46 and 48 may be stricken, pressed, or otherwise deformed inwardly in order to capture the hand grip 10 and prevent the removal of the hand grip 10 from the recess 41. As shown in FIG. 3, after deforming, the end walls 46, 48 engage and closely mate with the tapered end wall surfaces 16, 18 of the hand grip 10. As such, the deformed first end wall 46 may prevent movement of the first end wall surface 16 of the hand grip 10 in the upward direction Du away from the base surface 42 of the recess 41. Similarly, the deformed second end wall 48 may prevent movement of the second end wall surface 18 of the hand grip 10 in the upward direction Du away from the base surface 42 of the recess 41. Thus, the deformed end walls 46, 48 may prevent the removal of the hand grip 10 from the recess 41 of the handle 40.

Figure 4:
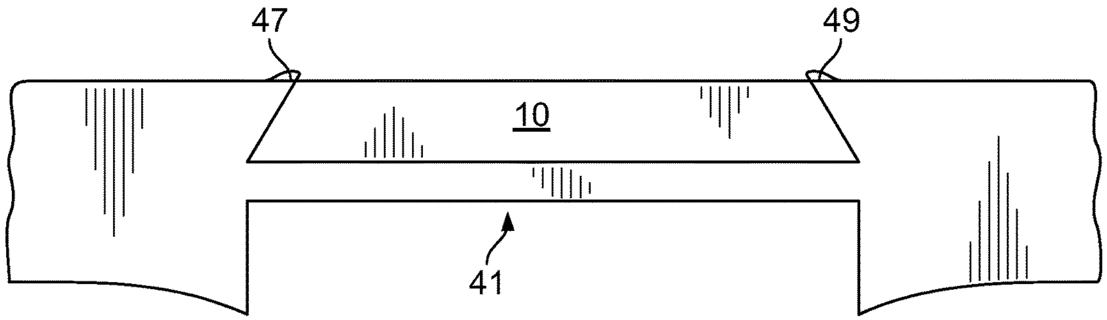

To permit such deformation and retention of the hand grip 10, the end walls 46, 48 may include excess material to ensure that the end walls 46, 48 include sufficient material to capture the hand grip 10. In particular, the end walls 46, 48 may extend above the hand grip 10 when the hand grip 10 is placed in the recess 41. See, FIG. 2. After striking, pressing, or otherwise deforming the end walls 46, 48, excess material or a bur 47, 49 may develop on the surface of the handle 40 as shown in FIG. 4. The mounted hand grip 10 and handle 40 may undergo further processing (e.g., filing, sanding, etc.) to remove such burs 47, 49 and obtain a smooth handle surface as shown FIG. 3.

FIGS. 1-4 depict deforming both end walls 46, 48 after placing the hand grip 10 in recess 41. However, in some embodiments end wall 46 may be configured to closely match end wall surface 16 of the hand grip 10 upon placement of the hand grip 10 into recess 41. As such, only end wall 48 may be stricken, pressed, or otherwise deformed into engagement with the end wall surface 18 of the hand grip 16.

Figure 5:
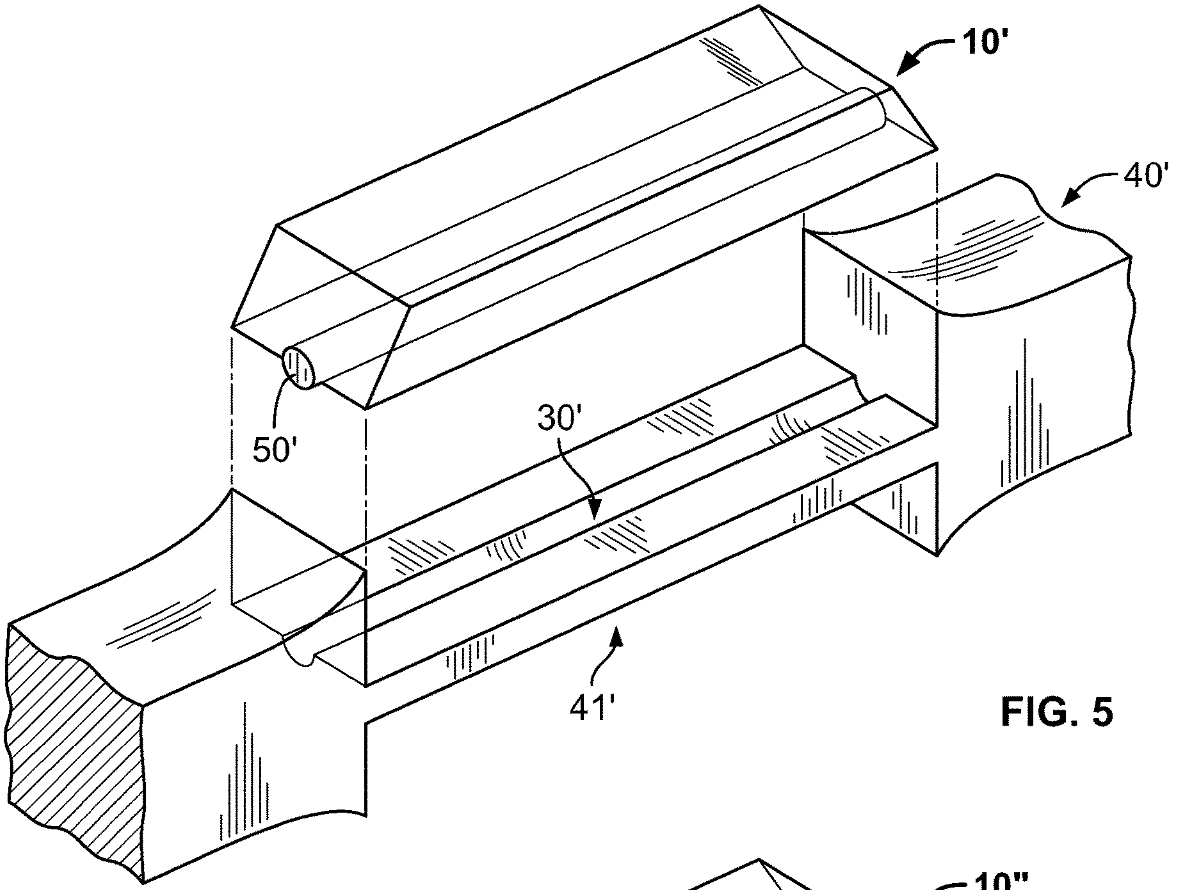
FIG. 5 depicts a hand grip and handle in accordance with another embodiment.

Referring now to FIG. 5, another embodiment of a hand grip 10' and recess 41' are shown. The hand grip 10' and recess 41' of FIG. 5 are similar to the hand grip 10 and recess 41 of FIG. 1. However, in the embodiment of FIG. 5, the channel and rib have swapped places. In FIG. 1, the hand grip 10 includes channel 30 and recess 41 includes rib 50. In FIG. 5, the hand grip 10' includes rib 50' that projects from the base surface 12' and the recess 41' includes a channel 30' that provides a depression into the base surface 42'. The channel 30' in the recess 41' is configured to receive the rib 50' of the hand grip 10' when the hand grip 10' is placed in the recess 41'.

Figure 6:
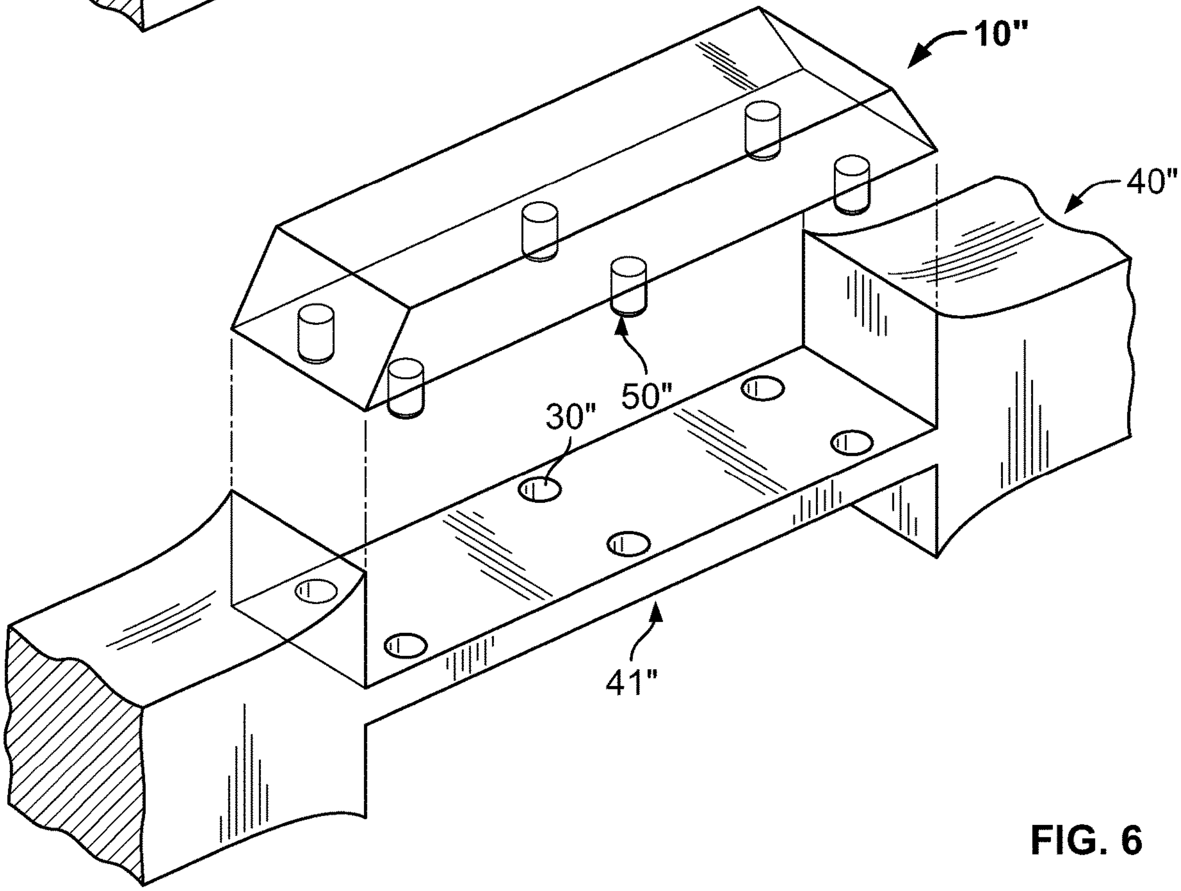
FIG. 6 depicts a hand grip and handle in accordance with a further embodiment.

Referring now to FIG. 6, another embodiment of a hand grip 10' and recess 41' are shown. The hand grip 10" and recess 41" of FIG. 6 are similar to the hand grip 10' and recess 41' of FIG. 5. However, in the embodiment of FIG. 6, the channel and rib have been replaced with a plurality of projections and depressions. In FIG. 5, the hand grip 10' includes a rib 50' and recess 41' includes a channel 30'. Such an embodiment may be viewed as having a single projection or rib 50' and a single depression or channel 40'. In FIG. 6, the hand grip 10" includes a plurality of projections 50" that project from the base surface 12" and the recess 41" includes a plurality of corresponding depressions 30" into the base surface 42". The depressions 30" in the recess 41" are configured to receive corresponding projections 50" of the hand grip 10" when the hand grip 10" is placed in the recess 41".

Figure 7:
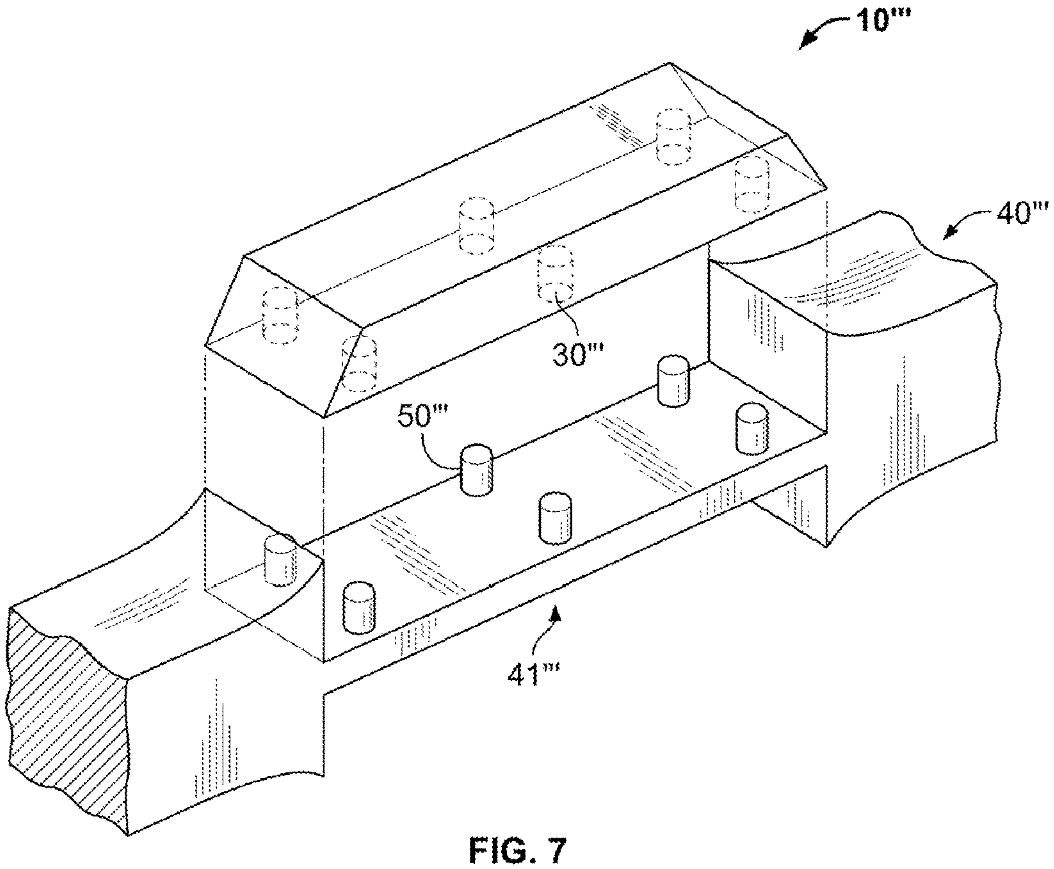
FIG. 7 depicts a hand grip and handle in accordance with yet another embodiment.

FIG. 7 depicts another embodiment in which the hand grip 10''' includes a plurality of depressions 30''' and the recess 41''' includes a corresponding plurality of projections 50'''. The depressions 30" in the hand grip 10" are configured to receive corresponding projections 50" from the recess 41''' when the hand grip 10''' is placed in the recess 41'''.

Figure 8:
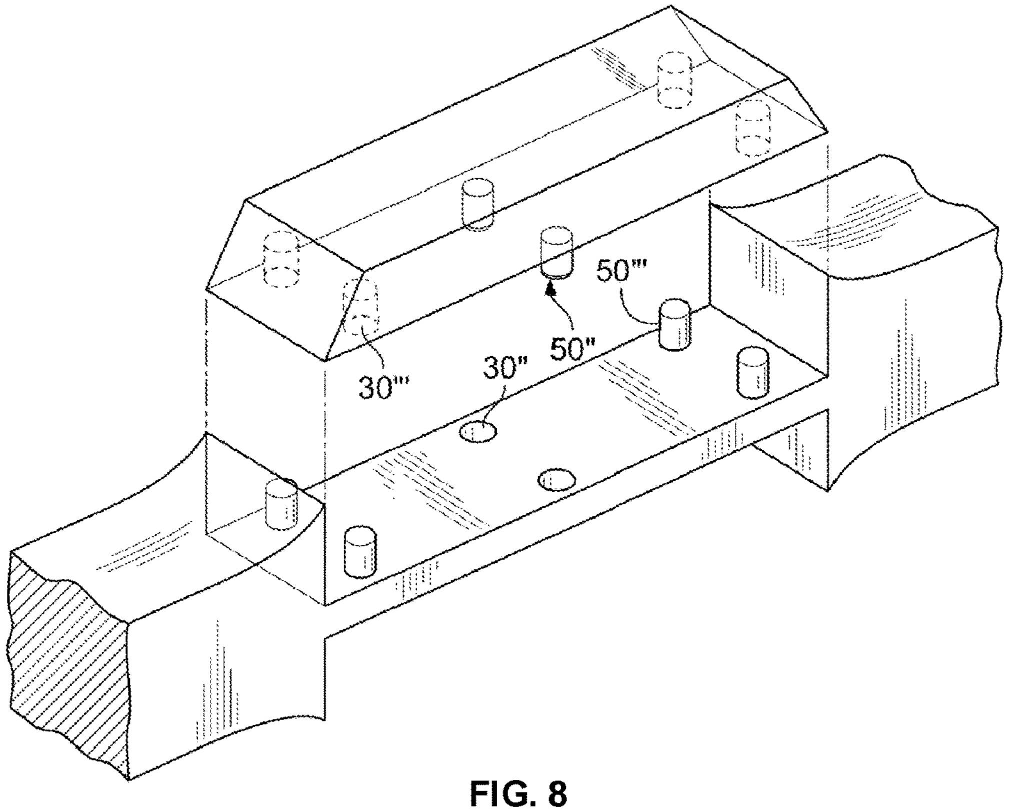
FIG. 8 depicts a hand grip and handle in accordance with yet further embodiment.
Figure 9:
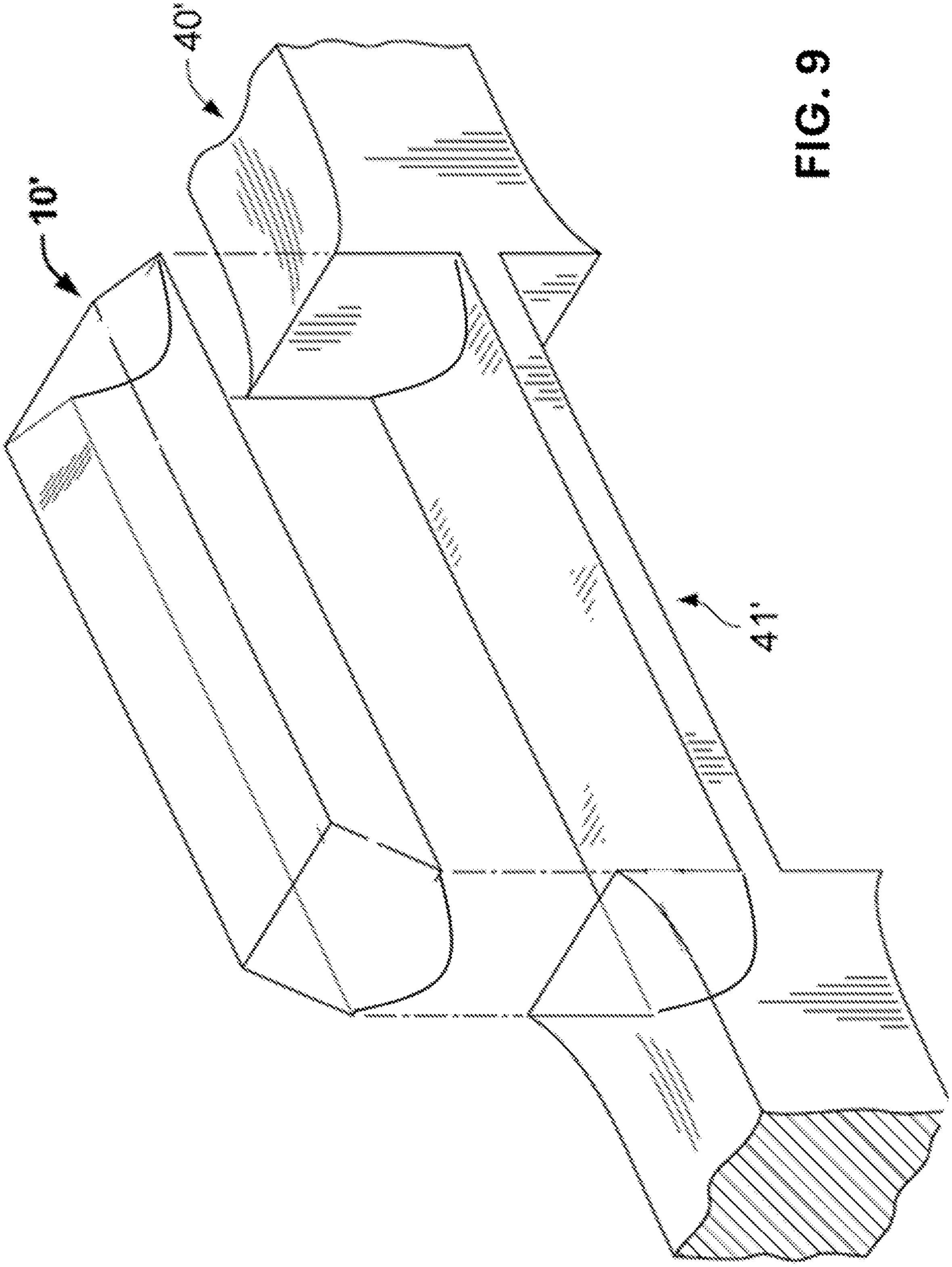
FIG. 9 depicts a hand grip and handle in accordance with yet further embodiment.

While certain embodiments have been described, it will be understood by those skilled in the art that various changes may be made and equivalents may be substituted without departing from the scope of the appended claims. For example, embodiments have been shown in which the hand grip and recess each includes either depressions or projections. In some embodiments, the hand grip may include both depressions 30''' and projections 50" configured to respectively interact with corresponding projections 50'''' and depressions 30" on the recess. See, e.g., FIG. 8. Furthermore, embodiments have been shown where base surfaces of the hand grip and recess include a single rib or a single channel. In some embodiments, the base surfaces may be the single projection or depression. For example, the base surface of the hand grip may be convex and the base surface of the recess may be concave and prevent lateral movement of the hand grip. See, e.g., FIG. 9.

Other modifications may be made to adapt a particular situation or material to the teachings of the present invention without departing from its scope. Therefore, it is intended that the present invention not be limited to the particular embodiment or embodiments disclosed, but that the present invention encompasses all embodiments falling within the scope of the appended claims.

What is claimed is:

1. A method of adding a hand grip to a tool, the method comprising:

placing the hand grip in a recess of a handle of the tool, wherein:

the hand grip comprises a hand grip base, a hand grip top opposite the hand grip base, a hand grip first end wall, and a hand grip second end wall, and the hand grip first end wall and the hand grip second end wall taper inwardly from the hand grip base to the hand grip top such that the hand grip base is wider than the hand grip top; and deforming a first handle portion such that the first handle portion reduces an opening of the recess, directly engages the hand grip first end wall, and impedes removal of the hand grip from the recess.

2. The method of claim 1, comprising deforming a second handle portion such that the second handle portion reduces the opening of the recess, directly engages the hand grip second end wall, and impedes removal of the hand grip from the recess.

3. The method of claim 1, comprising inserting a rib extending from a surface of the recess into a channel in the hand grip base.

4. The method of claim 1, comprising inserting a rib extending from the hand grip base into a channel in a surface of the recess.

5. The method of claim 1, comprising inserting first projections extending from a surface of the recess into first depressions in the hand grip base.

6. The method of claim 5, comprising inserting second projections extending from the hand grip base into second depressions in the surface of the recess.

7. The method of claim 1, comprising inserting projections extending from the hand grip base into depressions in a surface of the recess.

8. The method of claim 1, wherein:

the hand grip base is convex, and the method comprises inserting the hand grip base into a concave surface of the recess.

9. A tool, comprising:

a handle coupled to the tool, the handle comprising:

one or more lateral surfaces that extend between a first end of the handle and a second end of the handle; and a first recess in a first lateral surface of the one or more lateral surfaces, wherein a first recess base of the first recess is wider than a first recess opening into the first recess; and a first hand grip mounted in the first recess, the first hand grip comprising a first hand grip base and a first hand grip top opposite the first hand grip base, wherein:

the first hand grip base is wider than the first recess opening, the first hand grip top is narrower than the first recess opening, the first hand grip top defines a first portion of a handle outer surface of the handle that a user grasps to operate the tool, and the first recess comprises end walls that are formed inward to directly engage tapered end walls of the first hand grip and impede removal of the first hand grip from the first recess.

10. The tool of claim 9, wherein:

first end walls of the first recess taper inwardly from the first recess base to the first recess opening, and the first end walls contact the first hand grip and impede removal of the first hand grip from the first recess.

11. The tool of claim 9, wherein:

the first hand grip comprises a channel in the first hand grip base, and the first recess comprises a rib extending from the first recess base and into the channel of the first hand grip base.

12. The tool of claim 9, wherein:

the first recess comprises a channel in the first recess base, and the first hand grip comprises a rib extending from the first hand grip base and into the channel in the first recess base.

13. The tool of claim 9, wherein:

the first hand grip comprises first depressions in the first hand grip base, and the first recess comprises first projections extending from the first recess base and into the first depressions of the first hand grip base.

14. The tool of claim 13, wherein:

the first recess comprises second depressions in the first recess base, and the first hand grip comprises second projections extending from the first hand grip base and into the second depressions in the first recess base.

15. The tool of claim 9, wherein:

the first recess comprises depressions in the first recess base, and the first hand grip comprises projections extending from the first hand grip base and into the depressions in the first recess base.

16. The tool of claim 9, wherein:

the first recess base is concave, and the first recess base is convex and engages the first recess base.

17. The tool of claim 9, wherein the handle includes:

a second recess in a second lateral surface of the one or more lateral surfaces that is opposite the first lateral surface, and a second hand grip mounted in the second recess.

18. The tool of claim 17, wherein:

second end walls of the second recess taper inwardly from a second recess base to a second recess opening, and the second end walls contact the second hand grip and impede removal of the second hand grip from the second recess.

19. The tool of claim 17, wherein:

a second hand grip base of the second hand grip engages a second recess base of the second recess, and a second hand grip top of the second hand grip defines a second portion of the handle outer surface that is opposite the first portion of the handle outer surface.

20. The tool of claim 19, wherein:

the first recess base is substantially parallel to the second recess base, the handle includes a tang that traverses the first recess and the second recess, and the tang is sandwiched between the first hand grip and the second hand grip.

* * * * *